Jan. 3, 1961 R. FENNEMA 2,966,923
POSITION INDICATING STEM CAP
Filed Aug. 21, 1958
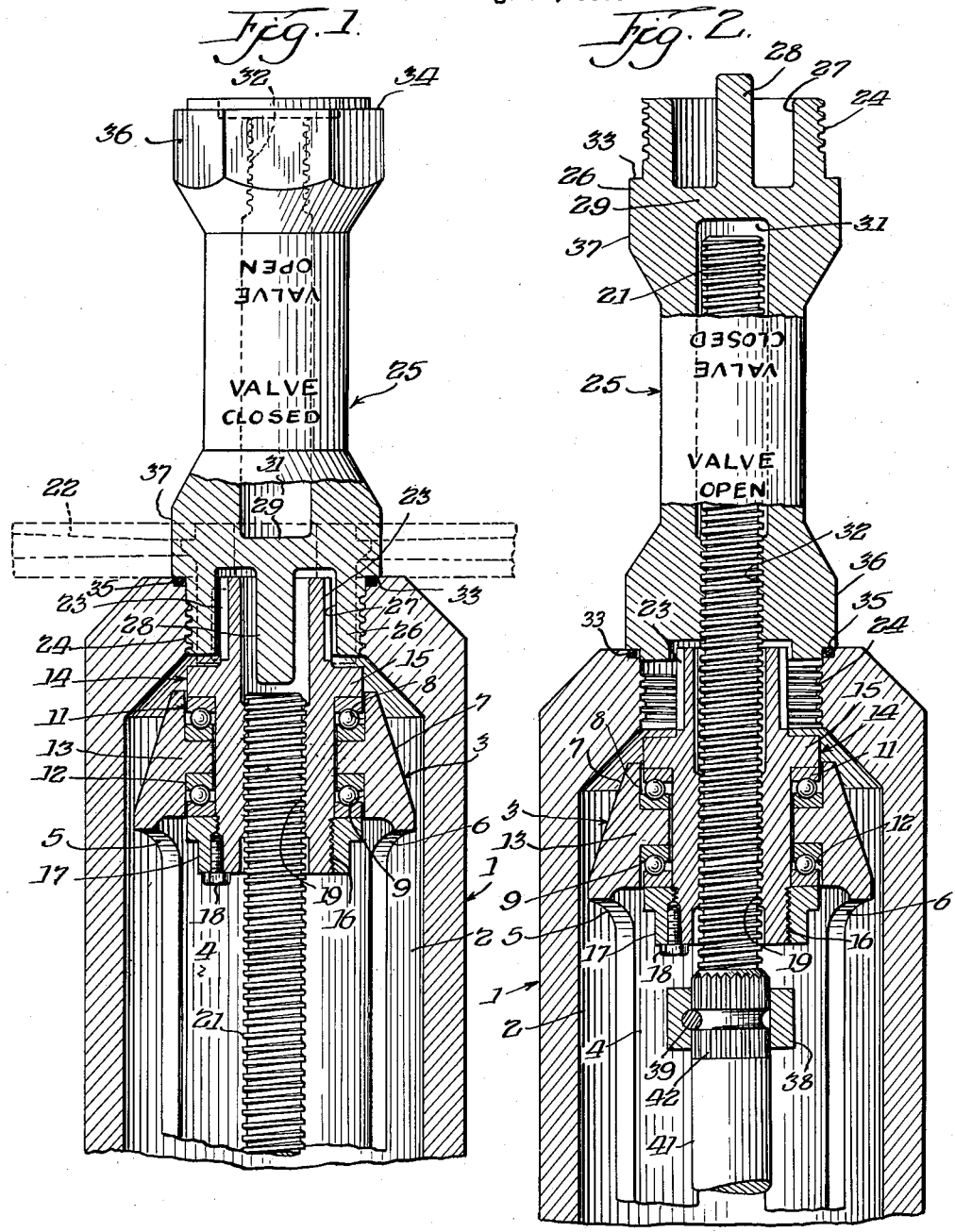
Inventor.
Richard Fennema.
By Joseph O. Lange
Atty.

United States Patent Office 2,966,923
Patented Jan. 3, 1961

2,966,923
POSITION INDICATING STEM CAP

Richard Fennema, Chicago, Ill., assignor to Crane Co., Chicago, Ill., a corporation of Illinois Filed Aug. 21, 1958, Ser. No. 756,460

10 Claims. (Cl. 137—270)

This invention relates to valves generally and more particularly it is concerned with a novel position indicating stem cap for valves and the like.

At the outset, in order to have a better appreciation of the significance of this invention, it should be understood in connection with the use of valves in pressurized water nuclear power plants that capped valves are used as a means of containing packing leakage in order to reduce compartment activity and also to protect operating personnel. However, when a stem cap is presently installed means are not provided by which the operating personnel can ascertain the position of the valve, that is, whether it is open or closed, without removing the cap itself which frequently necessitates costly delays as well as to expose the operators to line hazards.

Therefore, it is one of the more important objects of this invention to provide a cap design in which positive means of visual indication is provided to facilitate valve line-up check-out for installation, operation or maintenance without substantial inconvenience.

Another object of this invention is to provide for a position indicating stem cap of a relatively simple construction and comparatively fool-proof in its application.

Another object is to provide for a cap design in which in the closed position of the valve the cap can only be attached to the upper portion of the valve bonnet or yoke when the valve is fully seated.

A further object is to provide for a position-indicating construction in which in the fully open position of the valve the cap may be attached to the valve stem, as by means of the stem threads for example, and also provide a fluid-tight seal at the top of the bonnet or yoke.

A still further object of the novel cap design forming the subject matter of this invention is to provide a construction in which if an attempt is made to position the cap on the bonnet or yoke while indicating that the valve is open whereas it is actually closed, the cap of this invention cannot be attached and it will automatically fall out of position thereby to warn the operator as to the true position of the valve.

Similarly, the cap of this invention can only be attached in the position showing the valve to be closed when the valve is fully seated because of the novel form of cap structure employed and as hereinafter described in detail.

Other objects and advantages of this contribution will become more readily apparent upon proceeding with the specification read in light of the accompanying drawings, in which:

Fig. 1 is a fragmentary sectional view of the novel cap forming the subject matter of this invention with the cap applied and the valve indicated as being in the closed position.

Fig. 2 is a view similar to that described in connection with Fig. 1, except that the cap is applied correspondingly and the valve is indicated as being in the full open position.

Referring now to Fig. 1, an outer cap or enclosure 1 is shown generally designated 1 and which is provided with the chamber 2 within which a yoke or bonnet 3 is received. The latter member is provided with the usual oppositely disposed arms 4 to form the conventional slots or apertures 5 and 6 in supporting the hub 7 at the upper end thereof and functioning to hold a rising stem against rotation as in this case in the manner hereinafter referred to. The hub 7 is recessed as at 8 and 9 and preferably supplied with a pair of upper and lower thrust bearings 11 and 12 separated by the annular inwardly projecting shoulder 13.

Supported upon the upper yoke thrust bearing 11, a valve yoke sleeve generally designated 14 is provided having a median flange portion 15, the latter portion being received within the chamber for the said upper thrust bearing and extending inwardly past the shoulder 13. It is held against axial movement by means of the threaded shank portion 16 threadedly engaging the yoke nut 17 which is held in locked position by means of a cap screw 18. The yoke sleeve 14 is internally threaded in the usual manner as at 19 to receive the threaded valve stem 21. It will be appreciated that by rotation of the yoke sleeve 14 by means of the handwheel 22 partly indicated in dotted lines and having complementary splines which engage the annularly arranged splines 23 upon the yoke sleeve 14 the yoke sleeve may be suitably rotated. By virtue of such rotation the stem 21 will be caused to move inwardly or outwardly on the threaded recess 19 depending upon the direction of rotation of the handwheel. It will be understood also that if desired the handwheel is easily removable by simply disengaging the splines 23 and lifting the handwheel outwardly or upwardly when the valve has reached the desired position of being open or closed in the pipe line.

The significant portion of this invention now follows.

Assuming now that the valve has reached a fully closed position as indicated in Fig. 1 and that the handwheel 22 in such manner as above described has been removed, it will be noted that the outer cap generally designated 1 is internally threaded as at 24 to receive the valve position-indicating stem cap generally 25 and substituted for the handwheel 22. The said stem cap is provided with an exteriorly threaded depending shank 26 engaging the threads 24 and provided with an open chamber or recess 27 mounted over the splines 23 with suitable annular clearance. For the purpose of positively assuring that the valve is closed and that the stem is therefore in its lowermost axial position, the chamber 27 is preferably provided with a downwardly extending centrally positioned projection 28 which thus serves in effect as a gaging means.

With the hand wheel removed and with the cap mounted as illustrated in Fig. 1, it will be appreciated that with the described means of attachment the stem cap 27 must necessarily be removed and the handwheel replaced if the valve is to be opened.

Thus tampering is minimized and yet the personnel knows clearly the valve operating position.

Continuing with the description of the cap, the upper limits of the central projection 28 are defined by a transversely extending web portion 29 thereby to close the upper end of the chamber 27.

Above the web portion 29, the stem cap 25 is formed with an elongated chamber 31 to receive the stem 21 when the cap 25 is inverted as shown in Fig. 2, the upper limits of which chamber are defined by an internally threaded end portion 32. In order to effect a fluid tight seal with the outer cap or enclosure 1, a shoulder is preferably provided at 33 at the lower end thereof and at 34 at the upper end respectively as illustrated. A conventional gasket or O-ring 35 is interposed at 33 to complete the said seal. In order to permit of its convenient attachment as well as detachment, the stem cap 25 has the polygonal end portion 36 and 37 for gripping by a wrench. It will of course be apparent that depending upon the position of the valve, that is whether it is in the open or the closed positions, the stem capping thereof will be accordingly provided upon the outer cap 1.

It will also be understood that as shown more clearly in Fig. 2 after operation of the valve from the closed position of Fig. 1 to the full open position indicated in the former the stem cap 25 can be mounted properly in a single manner only as indicated. That is to say that the one end of the stem as indicated by the internal threads 32 is of a sufficient length and is suitably threaded so as to fit over and engage the threaded stem 21 receiving the latter member within the chamber 32 as shown at the same time that a fluid tight seal is made at 33 with the O-ring 35 to guard against the escape of any pressurized fluids to atmosphere. The partition 29 provides the sealing means for the chamber 32.

It will of course now be appreciated that the stem cap of this invention is only reversible with a change in valve position. Thus if an attempt were made to apply the cap 25 to indicate that the valve is closed rather than open as actually shown in Fig. 2 the central depending projection 28 would abut the end of the stem 21 and thereby prevent the incorrect positioning of the cap.

The splined coupling 38 (Fig. 2) is of a split or divided construction fitting over the splined portion 42 of the stem 41 and is held against loss due to detachment by the transversely extending lock screw 39. While it may with slight modification serve to join spaced apart stem portions where this becomes necessary, the principal purpose of the splined coupling is to hold the rising stem 41 against rotation by suitable engagement of such oppositely disposed slotted portions as 5 and 6 by transversely extending lugs thereon (not shown).

It will be appreciated further that only a single embodiment of the invention has been illustrated for the purpose of setting forth a preferred showing. Actually, the invention is capable of being exemplified in a wide variety of forms and therefore it is the desire that the scope of this invention be measured by the appended claims.

I claim:

1. In a valve actuating mechanism comprising a position indicating stem cap assembly, the combination of a valve bonnet, a cover for the bonnet, a yoke sleeve in the bonnet, a threaded stem in the yoke sleeve movable reciprocally relative to the bonnet between first and second positions, a stem cap fitted on the cover over the said stem, the said cap having oppositely disposed recessed ends, one of the ends being externally formed for attachment to the cover, the recess in said one end cooperating with an end portion of the yoke sleeve so that in one position the said latter end only of said cap can be applied to the valve bonnet cover, the opposite end of said cap being internally formed to engage the threaded end of the said stem when the latter is in its other position.

2. In a valve actuating mechanism comprising a position indicating stem cap assembly, a valve bonnet, journaling means in the bonnet, a cover for the bonnet, a valve stem in the journaling means reciprocally movable relative to the said bonnet between first and second positions, a cap fitted on the cover applied over the said stem, the cap being mounted on the cover in fluid-sealing relation and having oppositely disposed recessed end portions with a transverse partition there between, one of said recessed end portions of the cap being internally formed to engage the said stem in one position, the said cap in an opposite end portion thereof being provided with means for attachment to the said cover and having a projecting central portion for cooperation with an open end of the said journaling means.

3. In a valve actuating mechanism comprising a position indicating stem cap assembly, a valve bonnet, an enclosure for the bonnet, journaling means on the bonnet, a threaded stem movable reciprocally relative to the bonnet within said journaling means between first and second positions, a stem cap fitted on the enclosure mounted over the said stem, the said cap having oppositely disposed recessed ends, one of the ends being suitably threaded to cooperate with a threaded end portion of the stem so that in one position the said threaded end only of the said cap can be applied to the said bonnet, the recess of the opposite end providing for relatively little movement of the stem between first and second positions in the other position and having means at said opposite end for attachment of the said cap to the said enclosure in said other position.

4. In a valve actuating mechanism comprising a position indicating stem cap assembly for manually capped valves or the like, the combination of a valve bonnet, an enclosure for the bonnet, a valve stem reciprocally movable relative to the said bonnet between first and second positions, journaling means in the bonnet for the stem, a cap fitted on the enclosure over the stem, the cap being mounted on the bonnet enclosure in fluid-sealing relation and having oppositely disposed recessed end portions with a transverse partition therebetween, each of the latter recessed portions providing for attachment of the cap relative to the stem, one of said recessed end portions of the cap being internally formed to engage the said stem in one position, the said cap in an opposite end portion thereof being provided with means for attachment to the enclosure and with a projecting central portion in the other recessed end portion in spaced apart relation to the said stem in another position.

5. In a valve actuating mechanism comprising a position indicating stem cap assembly for manually capped valves or the like, the combination of a valve bonnet, a valve stem threaded and reciprocally movable relative to said bonnet between first and second positions, journalling means in the bonnet for the stem, a cover for the bonnet, a cap cooperating with the said cover and applied over the said stem, the cap being mounted on the said cover in fluid-sealing relation thereto and having oppositely disposed recessed end portions with a transverse partition therebetween, one of said recessed end portions of the cap being internally formed to engage the threads of said stem in one position, the said cap in an opposite end portion thereof being provided with means for attachment to the cover at the other stem position and with a projecting central potrion for cooperation with a central recessed portion of the said stem journaling means.

6. In an actuating mechanism comprising a position indicating stem cap assembly for valves or the like, the combination of a valve bonnet, an enclosure for the bonnet, a threaded stem movable reciprocally relative to the bonnet between first and second positions, a stem cap fitted on the enclosure over the said stem, a yoke sleeve for journaling said stem, the said cap having oppositely disposed recessed ends, one of the said ends being suitably formed to surround an end portion of the stem so that in one stem position the said surrounding end only of the said cap can be applied to the valve bonnet, the opposite end of said cap having means for attachment to the enclosure and being recessed to substantially receive an upper end of the said yoke sleeve in the other position, the latter recess providing for relatively little movement of the said stem in the latter position.

7. In a valve actuating mechanism comprising a position indicating stem cap assembly, the combination of a valve bonnet, an enclosure therefor, a threaded stem movable reciprocally relative to the bonnet between first and second positions, journaling means on the bonnet for the said stem, a cap mounted on said enclosure and fitted over the said stem, the said cap having an intermediate portion and oppositely disposed recessed ends, one of the ends being internally threaded to cooperate with a threaded end portion of the stem in one position, the opposite end of the said cap having a threaded portion for attachment to the said enclosure in the other position of the stem, the intermediate portion of said cap being formed with a chamber to receive a substantial upper portion of the said stem in the one stem position, the said opposite end of the cap providing for relatively little movement of the stem in the other stem position.

8. In a valve actuating mechanism of the character described, the combination in a position indicating stem cap for manually capped valves or the like, a valve bonnet therefor, an enclosure for the bonnet, a threaded rising stem movable relative to the said bonnet between first and second positions, journaling means on the bonnet for the stem, a cap mounted on the enclosure over the said stem, the said cap being mounted on the bonnet enclosure in fluid-sealing relation thereto and having oppositely disposed recessed end portions with a transverse partition therebetween, one of said recessed end portions of the cap being formed with a threaded recess to engage the threads of said rising stem only in one stem position, the said cap at the other of said end limit portions being provided with means for attaching the said cap to the said enclosure and also having means for preventing the said stem from entering the latter recessed end portion in the other stem position.

9. The combination in a valve actuating mechanism of a position indicating stem cap, a valve bonnet, a threaded stem movable reciprocally relative to the bonnet between first and second positions, a cover for the bonnet, a yoke sleeve in the bonnet for threadedly receiving said stem, a stem cap removably mounted over the said stem, the said cap being reversible and having oppositely disposed open ends to cooperate with an end portion of the stem, the cap providing that in one stem position one end of the said cap threadedly receives the said stem, the opposite end of said cap having internally applied means recessed to receive an upper open end of the yoke sleeve and to resist entry of the said stem in the opposite end when the stem is in the opposite end position, the said cap at said opposite end having means for attachment to the said bonnet cover, the said yoke sleeve being receivable within said cap at at least one position of the stem.

10. The combination in a valve actuating mechanism of a position indicating stem cap for capped valves or the like, a valve bonnet and a cover therefor, journaling means in the bonnet, a threaded valve stem reciprocally movable in said journaling means relative to the said bonnet between first and second positions, a cap mounted over the end of the stem, the said cap being mounted in fluid-sealing relation to the said cover and having oppositely disposed recessed end portions separated by a transversely extending wall therebetween, one of said recessed end portions of the cap engaging a threaded end portion of the said stem in one position thereof, the opposite end portion of said cap also being recessed and formed with connecting means to provide upon predetermined reversal of positioning of the end portions of the cap that the latter mentioned end portion will engage a portion of the valve bonnet cover and the said cap also having means in cooperation with said connecting means to prevent the entry of the valve stem into the said latter mentioned recessed end portion of the said cap.

No references cited.